United States Patent
Minoshima et al.

(10) Patent No.: US 9,203,289 B2
(45) Date of Patent: Dec. 1, 2015

(54) STATOR OF ROTARY ELECTRIC MACHINE

(71) Applicant: KABUSHIKI KAISHA TOYOTA JIDOSHOKKI, Kariya-shi, Aichi-ken (JP)

(72) Inventors: Norimoto Minoshima, Aichi-ken (JP); Masaki Saijo, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 376 days.

(21) Appl. No.: 13/765,078

(22) Filed: Feb. 12, 2013

(65) Prior Publication Data

US 2013/0221793 A1   Aug. 29, 2013

(30) Foreign Application Priority Data

Feb. 29, 2012   (JP) ................. 2012-044261

(51) Int. Cl.
*H02K 3/00* (2006.01)
*H02K 23/32* (2006.01)
*H02K 3/28* (2006.01)

(52) U.S. Cl.
CPC . *H02K 23/32* (2013.01); *H02K 3/28* (2013.01)

(58) Field of Classification Search
CPC ............ H02K 23/32; H02K 3/12; H02K 3/28
USPC ...................................................... 310/207
See application file for complete search history.

(56) References Cited

U.S. PATENT DOCUMENTS

| 6,223,784 | B1 | 5/2001 | Kirschner | |
|---|---|---|---|---|
| 6,414,410 | B1 * | 7/2002 | Nakamura et al. | ........... 310/179 |
| 2011/0260571 | A1 * | 10/2011 | Kashihara | ..................... 310/207 |

FOREIGN PATENT DOCUMENTS

| CN | 102111054 A | 6/2011 |
|---|---|---|
| DE | 102011016123 A1 | 10/2011 |
| JP | 52039105 A | 3/1977 |
| JP | 05227688 A | 9/1993 |
| JP | 2001-513320 A | 8/2001 |
| JP | 2003189525 A | 7/2003 |
| JP | 2006-311716 A | 11/2006 |
| JP | 2008017582 A | 1/2008 |

(Continued)

OTHER PUBLICATIONS

Sequenz et al., "Die Wicklungen elektrischer Maschinen", Springer-Verlag, 1954, 26 total pages.

Sequenz et al., "Windings of Electric Machines", Alternating Current—Special Windings, Springer Publishers, 1954, vol. 3, 26 total pages.

(Continued)

*Primary Examiner* — Dang Le
(74) *Attorney, Agent, or Firm* — Sughrue Mion, PLLC (57) ABSTRACT

A stator of a rotary electric machine includes a stator core and polyphase coils. The stator core has a plurality of slots. The polyphase coils are provided in the slots. Each phase of the polyphase coils has a plurality of coils formed for each pole and connected in parallel. When winding in which a coil pitch is equal to number of slots divided by number of poles is termed full-pitch winding, when winding in which a coil pitch is larger than the coil pitch of the full-pitch winding is termed long-pitch winding, and when winding in which a coil pitch is smaller than the coil pitch of the full-pitch winding is termed short-pitch winding, at least two of the coils of each phase are formed on the stator core by wave winding to alternate between the long-pitch winding and the short-pitch winding along a circumferential direction of the stator core.

5 Claims, 8 Drawing Sheets

(56) References Cited

FOREIGN PATENT DOCUMENTS

| | | |
|---|---|---|
| JP | 2009033832 A | 2/2009 |
| JP | 2011182522 A | 9/2011 |

OTHER PUBLICATIONS

Communication dated Jan. 27, 2015 from the State Intellectual Property Office of People's Republic of China in counterpart Application No. 201310058562.7.

* cited by examiner

STATOR OF ROTARY ELECTRIC MACHINE

BACKGROUND OF THE INVENTION

The present invention relates to a stator of a rotary electric machine with a plurality of poles, the stator including a stator core and polyphase coils, the stator core having teeth that define therebetween a plurality of slots, the polyphase coils being provided in the slots, each phase of the polyphase coils having a plurality of coils that are formed for each pole and connected in parallel.

In some rotary electric machines, the rotor and the stator are disposed eccentrically with respect to each other. In the stator wherein coils are connected in parallel, imbalance of electromotive force caused by the eccentricity may generate cyclic current in the parallel circuit thereby to cause an increase of noise and of vibration of the rotary electric machine during the operation. In order to reduce the cyclic current, Japanese Unexamined Patent Application Publication No. 2006-311716 discloses a winding structure of a rotary electric machine.

Figure 10:
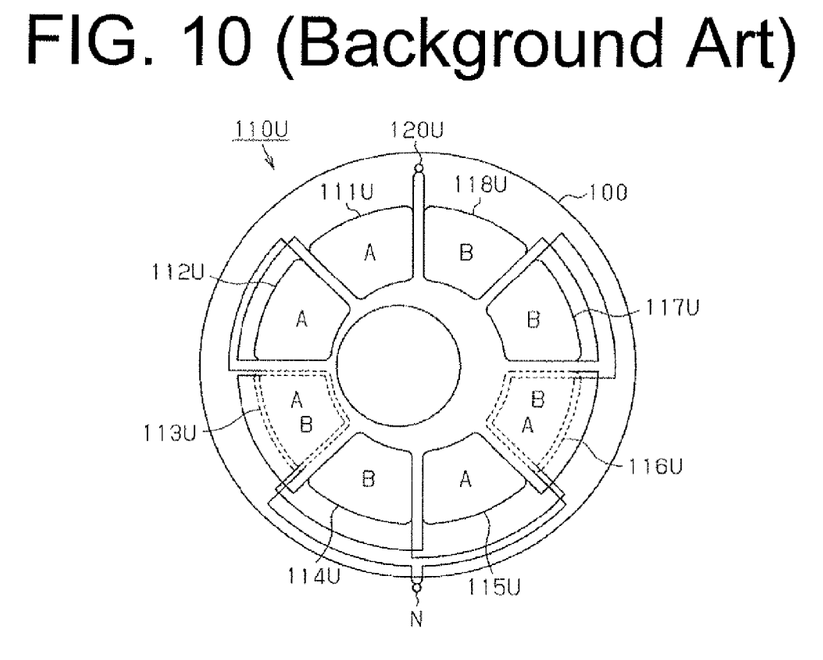
FIG. 10 is a schematic view showing a winding structure of a rotary electric machine according to a background art.

The stator winding of this Publication includes a U-phase coil, a V-phase coil and a W-phase coil. Referring to FIG. 10, one end of the U-phase coil 110U is connected to a U-phase terminal 120U of a three-phase cable and the other end serves as a neutral point N. The U-phase coil 110U includes U-phase coils 111U-118U. The U-phase coils 111U, 112U, 115U, 116U are connected in series to form a first coil group A. The U-phase coils 113U, 114U, 117U, 118U are connected in series to form a second coil group B. The first coil group A and the second coil group B are connected in parallel.

The first coil group A is so arranged that the U-phase coils 111U, 112U and 115U, 116U are spaced from each other in the circumferential direction of the stator core 100 and face each other in the radial direction of the stator core 100. The second coil group B is so arranged that the U-phase coils 113U, 114U and 117U, 118U are spaced from each other in the circumferential direction of the stator core 100 and face each other in the radial direction of the stator core 100. Therefore, in a rotary electric machine having the rotor and the stator disposed eccentrically with respect to each other, the electromagnetic balance is kept thereby to reduce the cyclic current flowing between the first coil group A and the second coil group B connected in parallel.

A part of the wire connecting the U-phase coils 112U and 115U of the first coil group A to each other is wound around the same teeth around which the U-phase coil 113U of the second coil group B is also wound, as indicated by the dashed line in FIG. 10. A part of the wire connecting the U-phase coils 114U and 117U of the second coil group B to each other is wound around the same teeth around which the U-phase coil 116U of the first coil group A is also wound, as indicated by the dashed line in FIG. 10. In the structure wherein the connecting wires are used as a part of the coils and provided in the slots, the coil end of the stator is downsized.

Since the U-phase coils of each of the first coil group A and the second coil group B are spaced from each other to face each other, the connecting wires of the spaced U-phase coils are increased in length thereby to deteriorate the productivity in manufacturing of the coils.

The present invention is directed to providing a stator of a rotary electric machine with a plurality of poles, which prevents generation of the cyclic current flowing between the coils connected in parallel and also improves the productivity in manufacturing of the coils.

SUMMARY OF THE INVENTION

In accordance with an aspect of the present invention, there is provided a stator of a rotary electric machine with a plurality of poles. The stator includes a stator core and polyphase coils. The stator core has teeth that define therebetween a plurality of slots. The polyphase coils are provided in the slots. Each phase of the polyphase coils has a plurality of coils that are formed for each pole and connected in parallel. When winding in which a coil pitch is equal to number of the slots divided by number of the poles is termed full-pitch winding, when winding in which a coil pitch is larger than the coil pitch of the full-pitch winding is termed long-pitch winding, and when winding in which a coil pitch is smaller than the coil pitch of the full-pitch winding is termed short-pitch winding, at least two of the coils of each phase are formed on the stator core by wave winding so as to alternate between the long-pitch winding and the short-pitch winding along a circumferential direction of the stator core.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1:
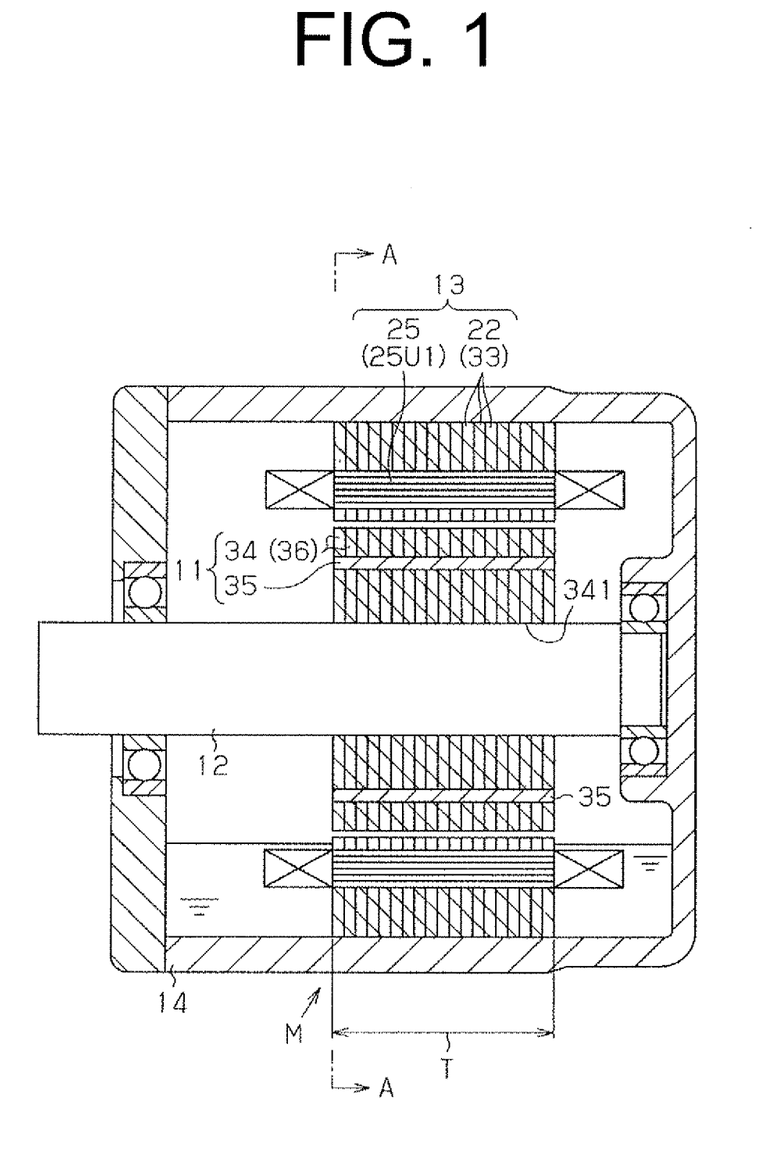
FIG. 1 is a longitudinal sectional view showing a rotary electric machine according to an embodiment of the present invention.

The following will describe the rotary electric machine according to the embodiment of the present invention with reference to FIGS. 1 through 5B. Referring to FIG. 1 showing the rotary electric machine in longitudinal sectional view, the rotary electric machine is designated by reference symbol M and includes a rotor 11, a rotary shaft 12, a stator 13 and a motor housing 14. The rotor 11 is fixedly mounted on the rotary shaft 12 and the stator 13 is fixedly mounted to the inner peripheral surface of the motor housing 14. Oil for cooling the stator 13 is sealed in the motor housing 14 to such a level that any part of the rotor 11 is not immersed in the oil.

Figure 2A:
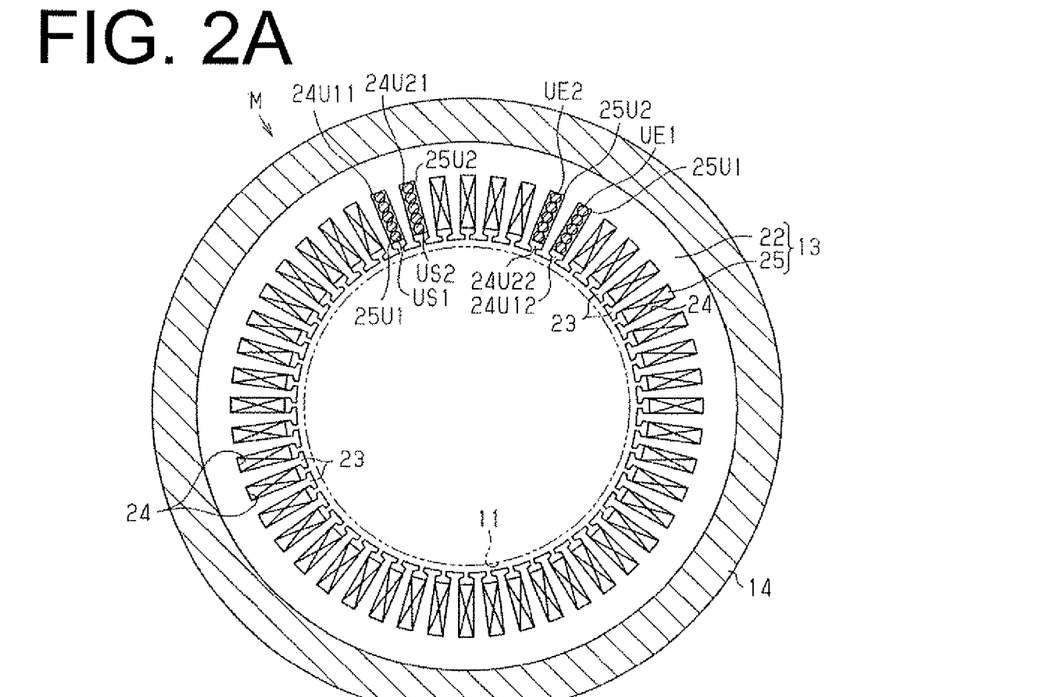
FIG. 2A is a cross sectional view taken along the line A-A in FIG. 1.

As shown in FIG. 2A, the stator 13 includes an annular stator core 22 having on the inner periphery thereof a plurality of teeth 23 that define a plurality of slots 24 between the teeth 23, and coils 25 inserted in the slots 24. The stator 13 has three phases, eight poles and 48 slots 24. In the following description, the number of the poles and the number of the slots 24 will be represented by P and S, respectively. The coils 25 are formed around the teeth 23 by wave winding. It is noted that showing of the coil end of each coil 25 is omitted from the drawing of FIG. 2A.

Referring back to FIG. 1, the stator core 22 is formed of a plurality of laminated core sheets 33. The core sheets 33 are made of a magnetic material such as a steel sheet. The axial length of the stator core 22, or the thickness of the core sheets 33 of the stator core 22, is designated by reference symbol T. The rotor 11 of the rotary electric machine M includes a rotor core 34 and a plurality of permanent magnets 35 embedded in the rotor core 34. The rotor core 34 is formed of a plurality of laminated core sheets 36. The core sheets 36 are made of a magnetic material such as a steel sheet. The rotor core 34 has at the axial center thereof a hole 341 through which the rotary shaft 12 is fixedly inserted.

Figure 2B:
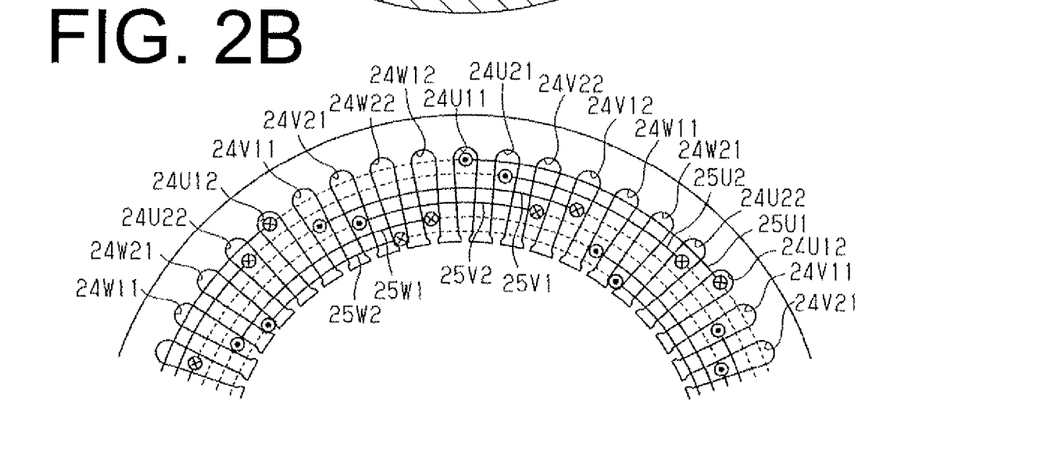
FIG. 2B is a fragmentary schematic view showing a stator core of the rotary electric machine of FIG. 2A.

FIG. 2B shows part of the slots 24 of FIG. 2A and the coil wiring schematically. As shown in the drawing, the coils 25 include a plurality of conducting wires. Specifically, the coils 25 include a first U-phase coil 25U1, a second U-phase coil 25U2, a first V-phase coil 25V1, a second V-phase coil 25V2, a first W-phase coil 25W1 and a second W-phase coil 25W2. The coil ends of the coils 25 are arranged in the order of the first U-phase coil 25U1, the second U-phase coil 25U2, the first V-phase coil 25V1, the second V-phase coil 25V2, the first W-phase coil 25W1 and the second W-phase coil 25W2 from the radially outer side toward the radially inner side of the stator core 22. Each coil 25 is filled in each slot 24 and arranged in a concentric manner with respect to the central axis of the rotary shaft 12.

The slots 24 in which the first U-phase coil 25U1 is wound are designated by reference numerals 24U11 and 24U12. The slots 24 in which the second U-phase coil 25U2 is wound are designated by reference numerals 24U21 and 24U22. Similarly, the slots 24 in which the first V-phase coil 25V1 is wound are designated by reference numerals 24V11 and 24V12. The slots 24 in which the second V-phase coil 25V2 is wound are designated by reference numerals 24V21 and 24V22. Similarly, the slots 24 in which the first W-phase coil 25W1 is wound are designated by reference numerals 24W11 and 24W12. The slots 24 in which the second W-phase coil 25W2 is wound are designated by reference numerals 24W21 and 24W22.

As indicated by the solid line in FIG. 2B, the first U-phase coil 25U1 has on one end surface of the stator core 22 a coil end that passes over six slots 24 between the adjacent slots 24U11 and 24U12, thus forming the coil pitch of seven slot pitches on the one end surface of the stator core 22. As indicated by the dashed line in FIG. 2B, the first U-phase coil 25U1 has on the other end surface of the stator core 22 a coil end that passes over four slots 24 between the adjacent slots 24U11 and 24U12, thus forming the coil pitch of five slot pitches on the other end surface of the stator core 22. On the other hand, as indicated by the solid line in FIG. 2B, the second U-phase coil 25U2 has on the one end surface of the stator core 22 a coil end that passes over four slots 24 between the adjacent slots 24U21 and 24U22, thus forming the coil pitch of five slot pitches on the one end surface of the stator core 22. As indicated by the dashed line in FIG. 2B, the second U-phase coil 25U2 has on the other end surface of the stator core 22 a coil end that passes over six slots 24 between the adjacent slots 24U21 and 24U22, thus forming the coil pitch of seven slot pitches on the other end surface of the stator core 22.

When the winding in which the coil pitch is equal to the number S of slots 24 divided by the number P of poles (or coil pitch=S/P) is termed the full-pitch winding, the winding in which the coil pitch is six (=48/8) slot pitches is the full-pitch winding of the present embodiment. The winding in which the coil pitch is larger than six slot pitches is termed the long-pitch winding of the present embodiment, and the winding in which the coil pitch is smaller than six slot pitches is termed the short-pitch winding of the present embodiment. The first U-phase coil 25U1 and the second U-phase coil 25U2 are formed on the stator core 22 by wave winding so as to alternate between five slot pitches and seven slot pitches. Specifically, the first U-phase coil 25U1 is formed on the one end surface of the stator core 22 by the long-pitch winding and on the other end surface of the stator core 22 by the short-pitch winding. On the other hand, the second U-phase coil 25U2 is formed on the one end surface of the stator core 22 by the short-pitch winding and on the other end surface of the stator core 22 by the long-pitch winding. The first U-phase coil 25U1 and the second U-phase coil 25U2 are formed around the teeth 23 so that the long-pitch winding and the short-pitch winding are paired on the one end surface of the stator core 22 and also that the short-pitch winding and the long-pitch winding are paired on the other end surface of the stator core 22.

Similarly, as indicated by the solid line in FIG. 2B, the first V-phase coil 25V1 has on the one end surface of the stator core 22 a coil end that passes over six slots 24 between the adjacent slots 24V11 and 24V12, thus forming the coil pitch of seven slot pitches (or long-pitch winding) on the one end surface of the stator core 22. As indicated by the dashed line in FIG. 2B, the first V-phase coil 25V1 has on the other end surface of the stator core 22 a coil end that passes over four slots 24 between the adjacent slots 24V11 and 24V12, thus forming the coil pitch of five slot pitches (or short-pitch winding) on the other end surface of the stator core 22.

On the other hand, as indicated by the solid line in FIG. 2B, the second V-phase coil 25V2 has on the one end surface of the stator core 22 a coil end that passes over four slots 24 between the adjacent slots 24V21 and 24V22, thus forming the coil pitch of five slot pitches (or short-pitch winding) on the one end surface of the stator core 22. As indicated by the dashed line in FIG. 2B, the second V-phase coil 25V2 has on the other end surface of the stator core 22 a coil end that passes over six slots 24 between the adjacent slots 24V21 and 24V22, thus forming the coil pitch of seven slot pitches (or long-pitch winding) on the other end surface of the stator core 22. The first V-phase coil 25V1 and the second V-phase coil 25V2 are formed on the stator core 22 by wave winding so as to alternate between the short-pitch winding and the long-pitch winding. The first V-phase coil 25V1 and the second V-phase coil 25V2 are formed around the teeth 23 so that the long-pitch winding and the short-pitch winding are paired on the one end surface of the stator core 22 and also that the short-pitch winding and the long-pitch winding are paired on the other end surface of the stator core 22.

Similarly, as indicated by the solid line in FIG. 2B, the first W-phase coil 25W1 has on the one end surface of the stator core 22 a coil end that passes over six slots 24 between the adjacent slots 24W11 and 24W12, thus forming the coil pitch of seven slot pitches (or long-pitch winding) on the one end surface of the stator core 22. As indicated by the dashed line in FIG. 2B, the first W-phase coil 25W1 has on the other end surface of the stator core 22 a coil end that passes over four slots 24 between the adjacent slots 24W11 and 24W12, thus forming the coil pitch of five slot pitches (or short-pitch winding) on the other end surface of the stator core 22.

On the other hand, as indicated by the solid line in FIG. 2B, the second W-phase coil 25W2 has on the one end surface of the stator core 22 a coil end that passes over four slots 24 between the adjacent slots 24W21 and 24W22, thus forming the coil pitch of five slot pitches (or short-pitch winding) on the one end surface of the stator core 22. As indicated by the dashed line in FIG. 2B, the second W-phase coil 25W2 has on the other end surface of the stator core 22 a coil end that passes over six slots 24 between the adjacent slots 24W21 and 24W22, thus forming the coil pitch of seven slot pitches (or long-pitch winding) on the other end surface of the stator core 22. The first W-phase coil 25W1 and the second W-phase coil 25W2 are formed on the stator core 22 by wave winding so as to alternate between the short-pitch winding and the long-pitch winding. The first W-phase coil 25W1 and the second W-phase coil 25W2 are formed around the teeth 23 so that the long-pitch winding and the short-pitch winding are paired on the one end surface of the stator core 22 and also that the short-pitch winding and the long-pitch winding are paired on the other end surface of the stator core 22.

Figure 3:
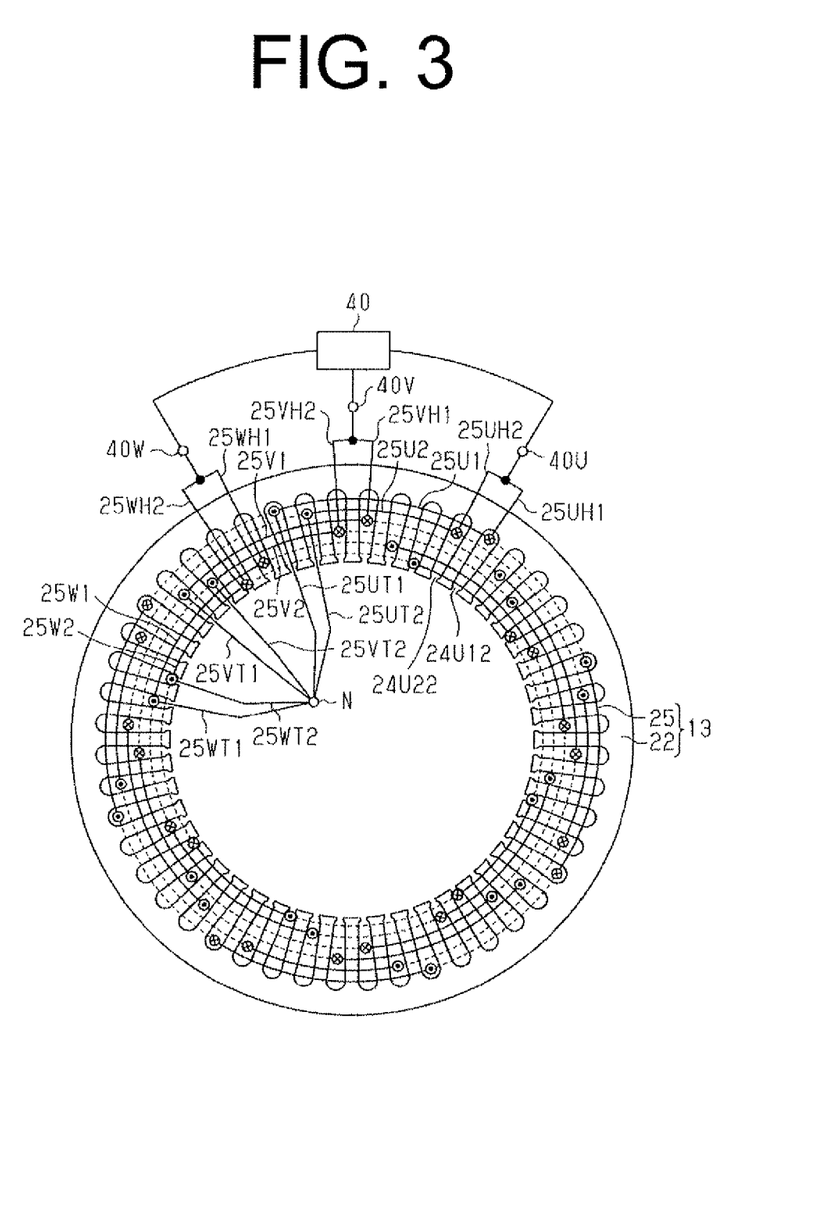
FIG. 3 is a schematic view illustrating a wave winding of the rotary electric machine of FIG. 1.

Referring to FIG. 3, one lead wire 25UH1 of the first U-phase coil 25U1 and one lead wire 25UH2 of the second U-phase coil 25U2 are connected to the U-phase terminal 40U of an inverter 40. One lead wire 25VH1 of the first V-phase coil 25V1 and one lead wire 25VH2 of the second V-phase coil 25V2 are connected to the V-phase terminal 40V of the inverter 40. One lead wire 25WH1 of the first W-phase coil 25W1 and one lead wire 25WH2 of the second W-phase coil 25W2 are connected to the W-phase terminal 40W of the inverter 40.

The other lead wire 25UT1 of the first U-phase coil 25U1 and the other lead wire 25UT2 of the second U-phase coil 25U2 are connected to each other at the neutral point N. The other lead wire 25VT1 of the first V-phase coil 25V1 and the other lead wire 25VT2 of the second V-phase coil 25V2 are connected to each other at the neutral point N. The other lead wire 25WT1 of the first W-phase coil 25W1 and the other lead wire 25WT2 of the second W-phase coil 25W2 are connected to each other at the neutral point N.

The lead wires 25UH1, 25UH2 of the U-phase coils 25U1, 25U2, the lead wires 25VH1, 25VH2 of the V-phase coils 25V1, 25V2, and the lead wires 25WH1, 25WH2 of the W-phase coils 25W1, 25W2 are arranged in a range of consecutive ten slots 24. The lead wires 25UT1, 25UT2 of the U-phase coils 25U1, 25U2, the lead wires 25VT1, 25VT2 of the V-phase coils 25V1, 25V2, and the lead wires 25WT1, 25WT2 of the W-phase coils 25W1, 25W2 are arranged in a range of consecutive ten slots 24. In such arrangements, the lead wires 25UH1, 25UH2, 25VH1, 25VH2, 25WH1, 25WH2 and the lead wires 25UT1, 25UT2, 25VT1, 25VT2, 25WT1, 25WT2 are all arranged in the mechanical angle (135°) for three poles. These lead wires 25UH1, 25UH2, 25VH1, 25VH2, 25WH1, 25WH2, 25UT1, 25UT2, 25VT1, 25VT2, 25WT1, 25WT2 are located in an upper region in the motor housing 14 as seen in FIG. 1 so as not to be immersed in the oil in the motor housing 14.

The following will describe the operation of the stator 13. In the U-phase coil of the stator 13, the first U-phase coil 25U1 and the second U-phase coil 25U2 are connected in parallel. The first U-phase coil 25U1 is formed around the teeth 23 by wave winding so as to alternate between the short-pitch winding and the long-pitch winding. The second U-phase coil 25U2 is formed around the teeth 23 by wave winding so that the long-pitch winding of the second U-phase coil 25U2 corresponds to the short-pitch winding of the first U-phase coil 25U1 and also that the second U-phase coil 25U2 alternates between the short-pitch winding and the long-pitch winding. In the present embodiment wherein each of the first U-phase coil 25U1 and the second U-phase coil 25U2 makes a complete turn in the stator core 22 by alternating between the short-pitch winding and the long-pitch winding, thus, the flux linkages generated in the first U-phase coil 25U1 and the second U-phase coil 25U2 connected in parallel are the same. Therefore, the difference in flux linkage between the first U-phase coil 25U1 and the second U-phase coil 25U2 connected in parallel and hence the difference in inductive voltage therebetween is eliminated, which prevents the generation of cyclic current. The same is true of the V-phase coil and W-phase coil.

Figure 5A:
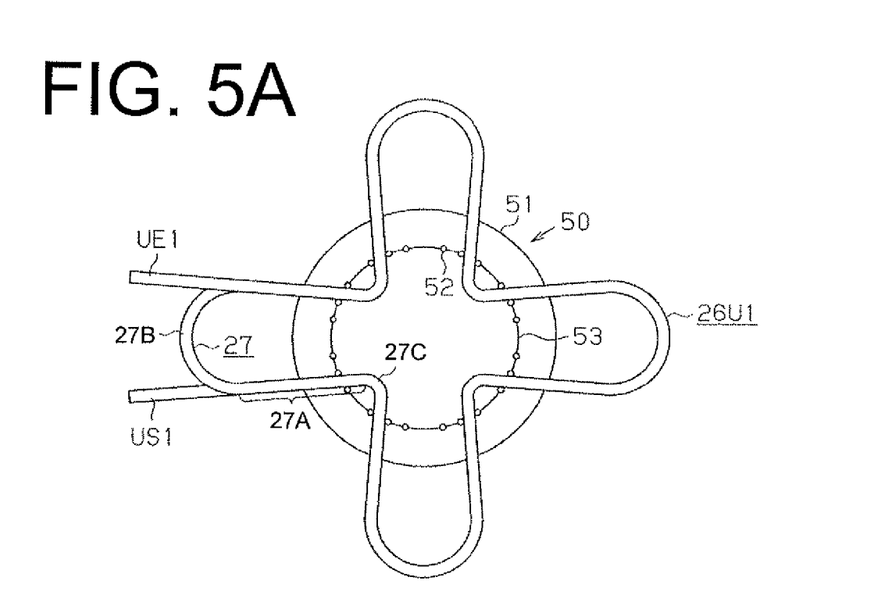
FIG. 5A is a plan view showing an inserter and the first U-phase coil of FIG. 4 placed on the inserter.
Figure 5B:
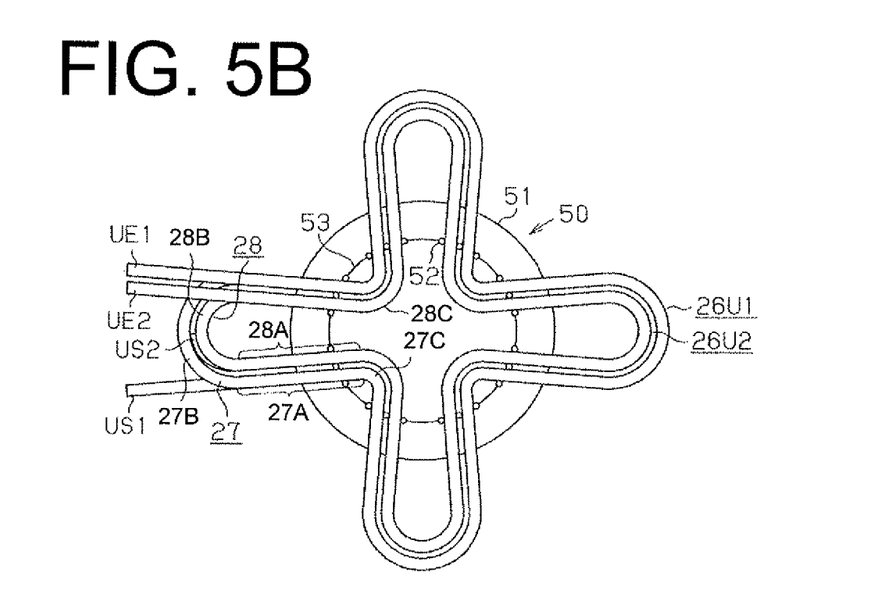
FIG. 5B is a plan view showing the second U-phase coil of FIG. 4 inserted in the first U-phase coil of FIG. 5A.

The above-described coils 25 are inserted into the slots 24 by using an inserter 50 as shown in FIGS. 5A and 5B. Since the way to insert the coils 25 into the slots 24 is common to the U-phase coil, the V-phase coil and the W-phase coil, the following will describe only the way to insert the first U-phase coil 25U1 and the second U-phase coil 25U2 of the U-phase coil into the slots 24U11, 24U12 and 24U21, 24U22, respectively.

Figure 4:
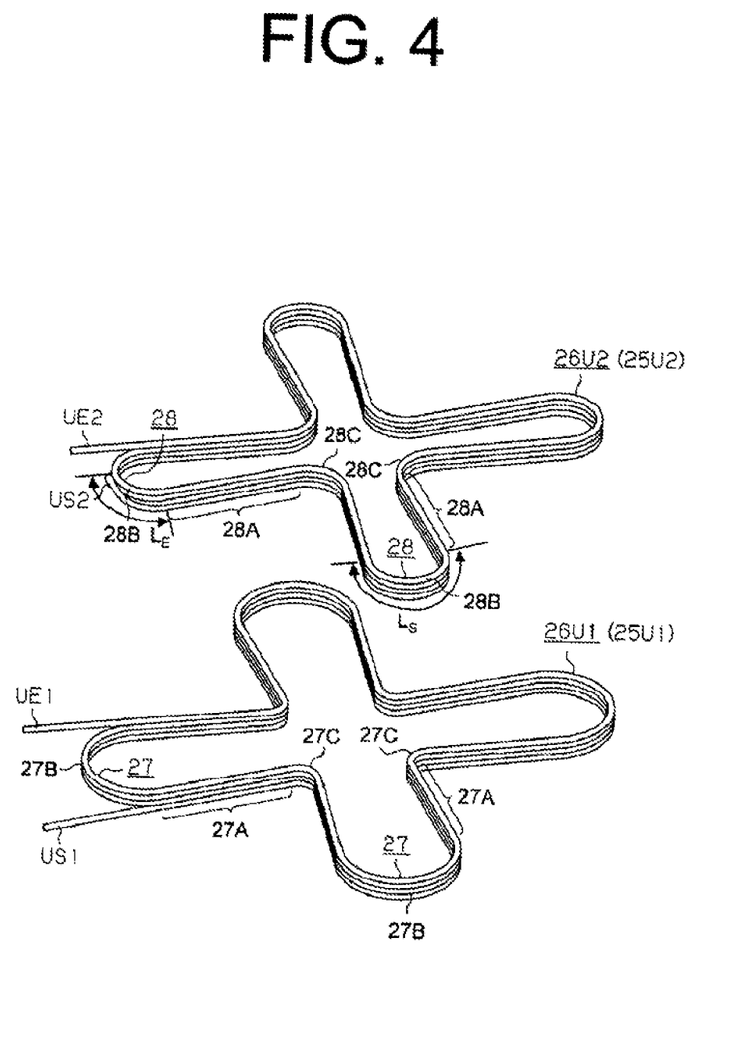
FIG. 4 is a perspective view showing a first U-phase coil and a second U-phase coil.

As shown in FIG. 4, the first U-phase coil 25U1 is formed by inserting a first U-phase preformed coil 26U1 into the slots 24U11, 24U12, and the second U-phase coil 25U2 is formed by inserting a second U-phase preformed coil 26U2 into the slots 24U21, 24U22. The first U-phase preformed coil 26U1 is made by forming a seamless conducting wire into an annular shape and then into a crisscross shape as shown in FIG. 4. The first U-phase preformed coil 26U1 is made so that the starting end US1 of winding (or one end of the conducting wire) is located on the lower side of the first U-phase preformed coil 26U1 and the terminating end UE1 of winding (or the other end of the conducting wire) is located on the upper side of the first U-phase preformed coil 26U1.

The first U-phase preformed coil 26U1 has four U-shaped bends 27. Each bend 27 has two straight portions 27A and an arched outer connecting portion 27B that connects the straight portions 27A. An arched inner connecting portion 27C is formed between two adjacent bends 27 for connecting such adjacent bends 27. In the state where the first U-phase preformed coil 26U1 is inserted in the slots 24U11 and 24U12, the straight portions 27A are inserted in the slots 24U11 and 24U12, the outer connecting portions 27B form the coil ends of the long-pitch winding, and the inner connecting portions 27C form the coil ends of the short-pitch winding. The length of each straight portion 27A is the same as or larger than the axial length of the stator core 22, or the thickness T of the core sheets 33. Each outer connecting portion 27B has a length corresponding to the coil pitch of seven slot pitches (or the long-pitch winding) extending along the circumferential direction of the stator core 22. Each inner connecting portion 27C has a length corresponding to the coil pitch of five slot pitches (or the short-pitch winding) extending along the circumferential direction of the stator core 22.

The second U-phase preformed coil 26U2 is made by forming a seamless conducting wire into an annular shape and then into a crisscross shape. The second U-phase preformed coil 26U2 is made so that the starting end US2 of winding (or one end of the conducting wire) is located on the lower side of the second U-phase preformed coil 26U2 and the terminating end UE2 of winding (or the other end of the conducting wire) is located on the upper side of the second U-phase preformed coil 26U2. The second U-phase preformed coil 26U2 has four U-shaped bends 28. Each bend 28 has two straight portions 28A and an arched outer connecting portion 28B that connects the straight portions 28A. An arched inner connecting portion 28C is formed between two adjacent bends 28 for connecting such adjacent bends 28. In the state where the second U-phase preformed coil 26U2 is inserted in the slots 24U21 and 24U22, the straight portions 28A are inserted in the slots 24U21 and 24U22, the outer connecting portions 28B form the coil ends of the short-pitch winding, and the inner connecting portions 28C form the coil ends of the long-pitch winding.

As in the case of the first U-phase preformed coil 26U1, the length of each straight portion 28A of the second U-phase preformed coil 26U2 is the same as or larger than the axial length of the stator core 22, or the thickness T of the core sheets 33. Each outer connecting portion 28B has a length corresponding to the coil pitch of five slot pitches (or the short-pitch winding) extending along the circumferential direction of the stator core 22. Each inner connecting portion 28C has a length corresponding to the coil pitch of seven slot pitches (or the long-pitch winding) extending along the circumferential direction of the stator core 22.

The second U-phase preformed coil 26U2 is formed so that the outer connecting portions 28B are smaller than the outer connecting portions 27B of the first U-phase preformed coil 26U1 and the inner connecting portions 28C are larger than the inner connecting portions 27C of the first U-phase preformed coil 26U1. That is, the second U-phase preformed coil 26U2 is formed slightly smaller than the first U-phase preformed coil 26U1. Thus, the second U-phase preformed coil 26U2 is insertable in the first U-phase preformed coil 26U1.

If the starting end US2 of the second U-phase preformed coil 26U2 extends from the straight portion 28A at a position adjacent to the outer connecting portion 28B as shown in FIG. 4, the length $L_E$ of the starting end US2 is the same as or smaller than the length of the coil pitch of the five slot pitches (or the short-pitch winding), namely, the length $L_S$ of the outer connecting portion 28B. In this case, the starting end US2 is arranged along the outer connecting portion 28B and serves as the lead wire of the present invention. That is, the starting end US2 and the terminating end UE2 extend from the straight portions 28A which form the short-pitch winding, and the length $L_E$ of the starting end US2 is set the same as or smaller than the length $L_S$ of the coil pitch of the short-pitch winding.

As shown in FIG. 5A, the inserter 50 includes a base 51, a plurality of rod-shaped inserter blades 52 disposed on the base 51 along a circle about the center of the base 51, and a stripper 53 that is disposed along the circle and movable up and down. In the present embodiment, eight sets of inserter blades 52, each set including three inserter blades 52, are located at regular intervals along the circle. Each set of the inserter blades 52 has two gaps formed between any two adjacent inserter blades 52. These three inserter blades 52 correspond to the tooth 23 that forms the slot 24U11 of the first U-phase coil 25U1 and the slot 24U21 of the second U-phase coil 25U2, and also to the tooth 23 that forms the slot 24U12 of the first U-phase coil 25U1 and the slot 24U22 of the second U-phase coil 25U2.

In inserting the first U-phase preformed coil 26U1 and the second U-phase preformed coil 26U2 into the slots 24, firstly the first U-phase preformed coil 26U1 is placed on the base 51 of the inserter 50. In this case, the first U-phase preformed coil 26U1 is set on the inserter 50 in such a way that the paired straight portions 27A of each bend 27 are inserted between the middle and the outer inserter blades 52, respectively, in the two adjacent sets of three inserter blades 52 for each bend 27, as shown in FIG. 5A. In addition, the first U-phase preformed coil 26U1 is set in such a way that each inner connecting portion 27C is located in the circle surrounded by the inserter blades 52 (or the circle of the stripper 53) and also that the starting end US1 is located outward of the outer connecting portion 27B so as to extend along the straight portion 27A and the terminating end UE1 is located outward of the outer connecting portion 27B so as to extend along the straight portion 27A.

After the first U-phase preformed coil 26U1 is placed on the base 51 of the inserter 50, the second U-phase preformed coil 26U2 is placed on the base 51 so as to be inserted in the first U-phase preformed coil 26U1 as shown in FIG. 5B. In this case, the second U-phase preformed coil 26U2 is set on the inserter 50 in such a way that the paired straight portions 28A of each bend 28 are inserted between the middle and the inner inserter blades 52, respectively, in the two adjacent sets of three inserter blades 52 for each bend 28, as shown in FIG. 5B. In addition, the second U-phase preformed coil 26U2 is set in such a way that each inner connecting portion 28C is located in the circle surrounded by the inserter blades 52 (or the circle of the stripper 53) and also that the starting end US2 is bent along the outer connecting portion 28B of the bend 28 so as to prevent mechanical interference with the first U-phase preformed coil 26U1 and the terminating end UE2 is located outward of the outer connecting portion 28B so as to extend along the straight portion 28A.

Pushing up the stripper 53 toward the stator core 22 (not shown in FIGS. 5A and 5B) with the first U-phase preformed coil 26U1 and the second U-phase preformed coil 26U2 placed on the base 51 as shown in FIG. 5B, the inner connecting portions 27C and 28C of the first U-phase preformed coil 26U1 and the second U-phase preformed coil 26U2 are pulled up, thereby allowing the straight portions 27A and 28A to be inserted into the slots 24U11, 24U12 and 24U21, 24U22 and the first U-phase coil 25U1 and the second U-phase coil 25U2 to be wound on the stator core 22, respectively.

When the first U-phase coil 25U1 and the second U-phase coil 25U2 are formed on the stator core 22 as shown in FIG. 2A, the starting end US1 located on the lower side of the first U-phase preformed coil 26U1 is located on the opened side of the slot 24U11 (or on the radially inner side of the stator core 22). The starting end US1 is connected to the lead wire 25UT1. The terminating end UE1 located on the upper side of the first U-phase preformed coil 26U1 is located on the inner side of the slot 24U12 and connected to the lead wire 25UH1.

In addition, the starting end US2 located on the lower side of the second U-phase preformed coil 26U2 is located on the opened side of the slot 24U21 (or on the radially inner side of the stator core 22). The starting end US2 is connected to the lead wire 25UT2. The terminating end UE2 located on the upper side of the second U-phase preformed coil 26U2 is located on the inner side of the slot 24U22 and connected to the lead wire 25UH2.

The present embodiment has the following advantageous effects.

(1) In the stator 13 of the rotary electric machine M, the first U-phase coil 25U1 and the second U-phase coil 25U2 of the U-phase coil are connected in parallel. The first U-phase coil 25U1 starts with the lead wire 25UH1 of short-pitch winding, alternates between the long-pitch winding and the short-pitch winding of wave winding along the circumferential direction of the stator core 22, and terminates with the long-pitch winding. The second U-phase coil 25U2 starts with the lead wire 25UH2 of long-pitch winding, alternates between the short-pitch winding and the long-pitch winding by wave winding along the circumferential direction of the stator core 22, and terminates with the short-pitch winding. The first U-phase coil 25U1 and the second U-phase coil 25U2 are formed on the stator core 22 so that the first U-phase coil 25U1 and the second U-phase coil 25U2 correspond to the short-pitch winding and the long-pitch winding in each pole and, therefore, the magnitude of the flux linkages generated in the first U-phase coil 25U1 and the second U-phase coil 25U2 are the same. Even if the rotor 11 is displaced eccentrically with respect to the stator 13, the flux linkages generated in the first U-phase coil 25U1 and the second U-phase coil 25U2 remain the same when each of the first U-phase coil 25U1 and the second U-phase coil 25U2 is seen as a whole. Therefore, the generation of the cyclic current flowing between the first U-phase coil 25U1 and the second U-phase coil 25U2 is prevented. The same is true of the V-phase coil and W-phase coil.

(2) Each of the first U-phase coil 25U1 and the second U-phase coil 25U2 is formed on the stator core 22 by wave winding so as to alternate between the short-pitch winding and the long-pitch winding. That is, each of the first U-phase coil 25U1 and the second U-phase coil 25U2 is formed on the stator core 22 by wave winding for a complete turn along the circumferential direction of the stator core 22. Unlike the case of the Japanese Unexamined Patent Application Publication No. 2006-311716, such coils need not be spaced from each other to face each other for preventing the generation of cyclic current, so that the length of the connecting wires of the coils need not be increased either. In the present embodiment wherein the first U-phase coil 25U1 and the second U-phase coil 25U2 are formed on the stator core 22 merely by wave winding, the productivity in manufacturing of the first U-phase coil 25U1 and the second U-phase coil 25U2 is improved. Similarly, the productivity in the case of the first V-phase coil 25V1, the second V-phase coil 25V2, the first W-phase coil 25W1 and the second W-phase coil 25W2 is improved.

(3) Each of the first U-phase coil 25U1 and the second U-phase coil 25U2 is formed on the stator core 22 by wave winding so as to alternate between the short-pitch winding and the long-pitch winding. In addition, in the first U-phase coil 25U1, the lead wires 25UH1 and 25UT1 are drawn out from the slots which are spaced away from each other at an interval corresponding to seven slot pitches. Furthermore, in the second U-phase coil 25U2, the lead wires 25UH2 and 25UT2 are drawn out from the slots which are spaced away from each other at an interval corresponding to five slot pitches. Therefore, although in the present embodiment the first U-phase coil 25U1 and the second U-phase coil 25U2 are connected in parallel, the lead wires 25UH1, 25UH2 and 25UT1, 25UT2 may be arranged close to each other. If the lead wires 25UH1, 25UH2 and 25UT1, 25UT2 are arranged so as to face each other in the radial direction of the stator core 22 as in the case of the Publication No. 2006-311716 and the rotary electric machine M is located transversely, the lead wires such as 25UT1 and 25UT2 are immersed in the oil in the motor housing 14. In order to prevent the immersion, the lead wires 25UT1 and 25UT2 need be arranged to extend to an upper region of the motor housing 14 in FIG. 1. In the present embodiment wherein the lead wires 25UH1, 25UH2 and 25UT1, 25UT2 are arranged in the upper region of the motor housing 14 in FIG. 1 when the rotary electric machine M is located transversely and the oil is sealed in the motor housing 14, however, the lead wires 25UH1, 25UH2 and 25UT1, 25UT2 are free from immersion in the oil in the motor housing 14. Similarly, the lead wires 25VH1, 25VH2, 25WH1, 25WH2, 25VT1, 25VT2, 25WT1 and 25WT2 of the first V-phase coil 25V1, the second V-phase coil 25V2, the first W-phase coil 25W1 and the second W-phase coil 25W2 are located close together, so that the lead wires are not immersed in the oil in the motor housing 14.

(4) The first U-phase preformed coil 26U1 and the second U-phase preformed coil 26U2 are inserted into the slots 24U11, 24U12 and 24U21, 24U22, respectively, by using the inserter 50. The length $L_E$ of the starting end US2 of the second U-phase preformed coil 26U2 is set the same as or smaller than the length $L_S$ corresponding to the coil pitch of five slot pitches (or the short-pitch winding). Bending the starting end US2 of the second U-phase preformed coil 26U2 along the outer connecting portion 28B of the bend 28 for preventing the starting end US2 from interfering with the first U-phase preformed coil 26U1 allows the tip of the starting end US2 to be drawn out of the end surface of the stator core 22 without being inserted into the slots 24U12 and 24U22 after the second U-phase preformed coil 26U2 is inserted in place in the slots 24U12 and 24U22. The same is true of the V-phase coil and W-phase coil.

(5) The lead wires 25UH1, 25UH2, 25VH1, 25VH2, 25WH1, 25WH2 and the lead wires 25UT1, 25UT2, 25VT1, 25VT2, 25WT1, 25WT2 are all arranged in a mechanical angle (135°) for three poles. Therefore, it is easy to connect the lead wires 25UH1, 25UH2, 25VH1, 25VH2, 25WH1, 25WH2 to the inverter 40 and also to connect the lead wires 25UT1, 25UT2, 25VT1, 25VT2, 25WT1, 25WT2 to each other at the neutral point N.

(6) In the present embodiment wherein the lead wires 25UT1, 25UT2, 25VT1, 25VT2, 25WT1, 25WT2 are all gathered on the radially inner side of the stator core 22, the length of the lead wires 25UT1, 25UT2, 25VT1, 25VT2, 25WT1, 25WT2 that extend in the circumferential direction of the stator core 22 may be made shorter than that in the case wherein the lead wires 25UT1, 25UT2, 25VT1, 25VT2, 25WT1, 25WT2 are gathered on the radially outer side of the stator core 22. Therefore, the length of the lead wires 25UT1, 25UT2, 25VT1, 25VT2, 25WT1, 25WT2 for connection to each other at the neutral point N is shortened.

The present invention has been described in the context of the above embodiment, but it is not limited to the embodiment. It is obvious to those skilled in the art that the invention may be practiced in various manners as exemplified below.

Figure 6:
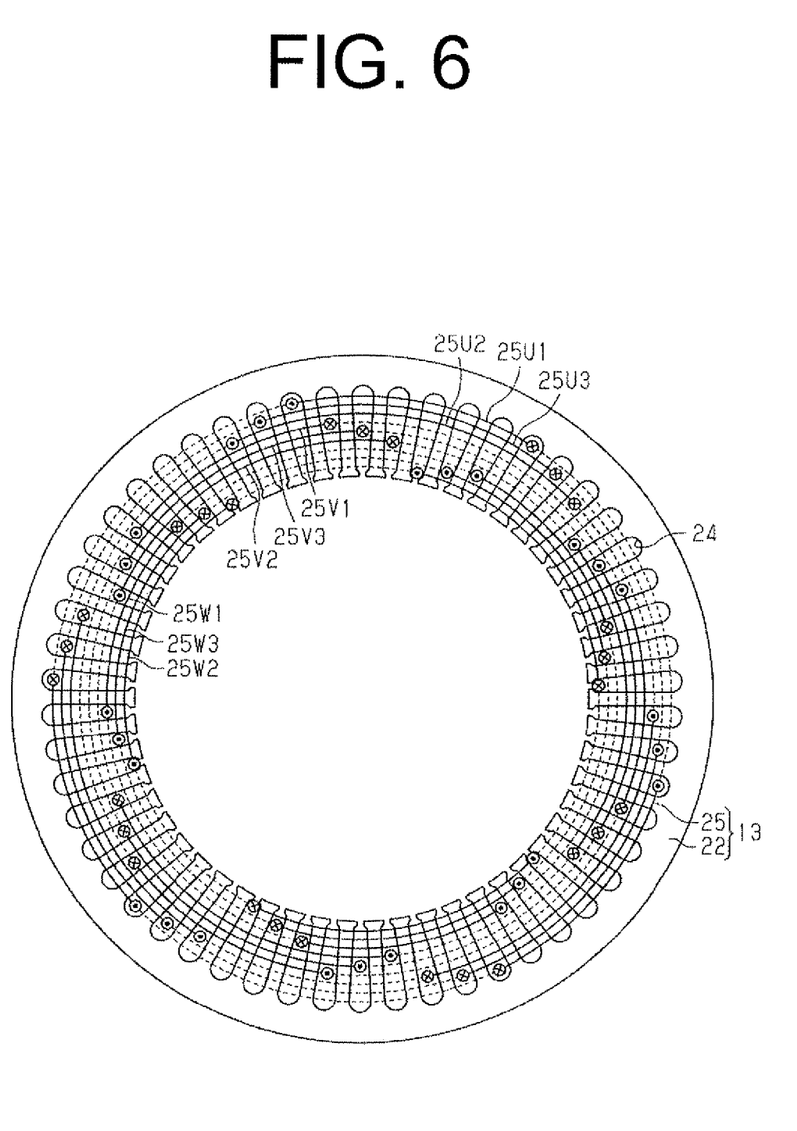
FIG. 6 is a schematic view showing a stator of a rotary electric machine according to another embodiment of the present invention.

Although in the above-described embodiment the stator 13 of the rotary electric machine M has three phases, eight poles and 48 slots, it may have three phases, six poles and 54 slots, as shown in FIG. 6. When the winding in which the coil pitch is equal to the number S of slots divided by the number P of poles (or coil pitch=S/P) is termed the full-pitch winding, the winding in which the coil pitch is nine (=54/6) slot pitches is the full-pitch winding of the present embodiment. The winding in which the coil pitch is larger than nine slot pitches is termed the long-pitch winding of the present embodiment, and the winding in which the coil pitch is smaller than nine slot pitches is termed the short-pitch winding of the present embodiment. Since the number of slots per pole per phase in this case is three, each phase has three coils of wave winding. If these three wave-winding coils are called as first coil, second coil and third coil, the first U-phase coil 25U, the second U-phase coil 25U2, the first V-phase coil 25V1, the second V-phase coil 25V2, the first W-phase coil 25W1 and the second W-phase coil 25W2 are formed on the stator core 22 by wave winding so as to alternate between seven slot pitches (or the short-pitch winding) and eleven slot pitches (or the long-pitch winding). The third U-phase coil 25U3, the third V-phase coil 25V3 and the third W-phase coil 25W3 are formed on the stator core 22 by wave winding so that the coil pitch is nine slot pitches (or the full-pitch winding).

Figure 7:
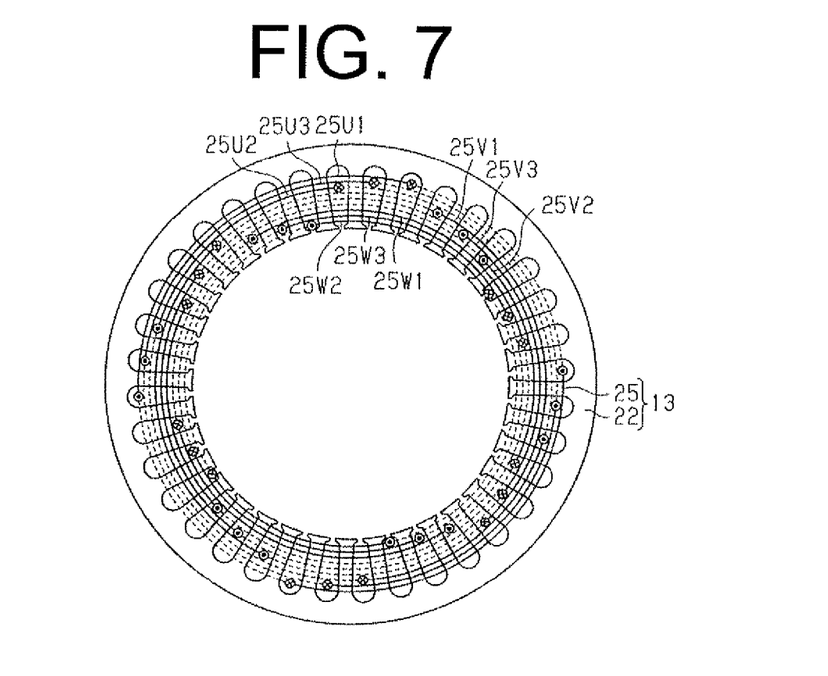
FIG. 7 is a schematic view showing a stator of a rotary electric machine according to yet another embodiment of the present invention.

The stator 13 of the rotary electric machine M may have three phases, four poles and 36 slots, as shown in FIG. 7. In this case, the winding in which the coil pitch is nine slot pitches is termed the full-pitch winding. Since the number of slots per pole per phase in this case is three, three wave-winding coils are formed on the stator core 22 as in the case of the stator 13 with three phases, six poles and 54 slots of FIG. 6.

Figure 8:
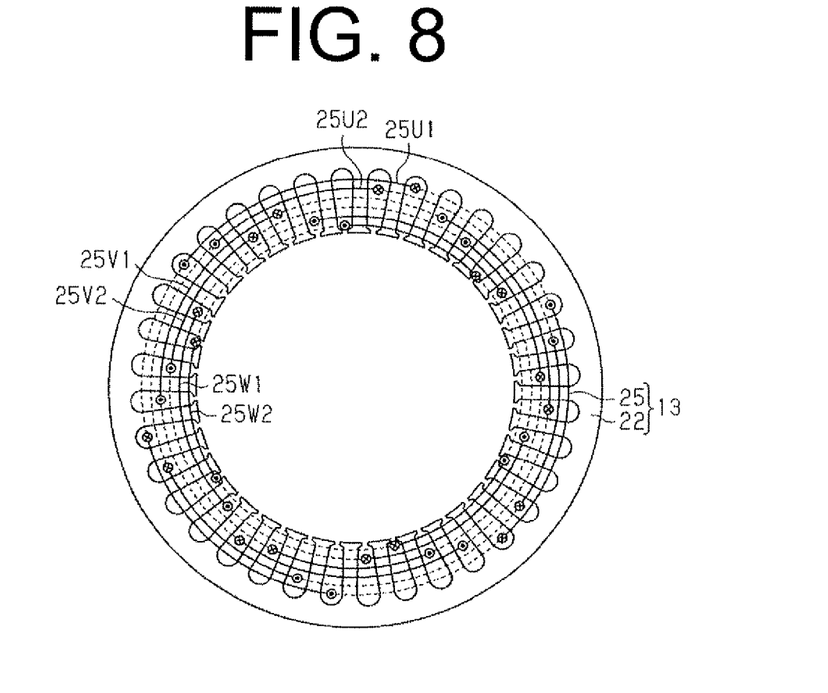
FIG. 8 is a schematic view showing a stator of a rotary electric machine according to yet another embodiment of the present invention.

The stator 13 of the rotary electric machine M may have three phases, six poles and 36 slots, as shown in FIG. 8. In this case, the winding in which the coil pitch is six slot pitches is termed the full-pitch winding. Since the number of slots per pole per phase in this case is two, two wave-winding coils are formed on the stator core 22 as in the case of the above-described embodiment.

Figure 9:
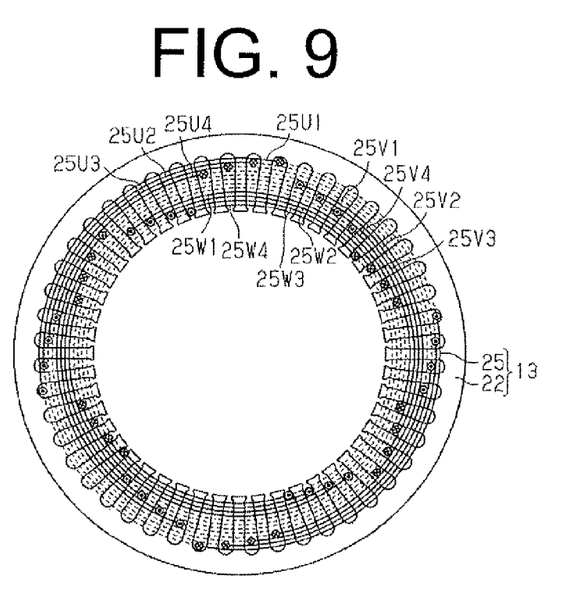
FIG. 9 is a schematic view showing a stator of a rotary electric machine according to yet another embodiment of the present invention.

The stator 13 of the rotary electric machine M may have three phases, four poles and 48 slots, as shown in FIG. 9. In this case, the winding in which the coil pitch is twelve slot pitches is termed the full-pitch winding. Since the number of slots per pole per phase in this case is four, each phase has four coils of wave winding. If these four wave-winding coils are called as first coil, second coil, third coil and fourth coil, the first U-phase coil 25U1, the fourth U-phase coil 25U4, the first V-phase coil 25V1, the fourth V-phase coil 25V4, the first W-phase coil 25W1 and the fourth W-phase coil 25W4 are formed on the stator core 22 by wave winding so as to alternate between nine slot pitches (or the short-pitch winding) and 15 slot pitches (or the long-pitch winding). The second U-phase coil 25U2, the third U-phase coil 25U3, the second V-phase coil 25V2, the third V-phase coil 25V3, the second W-phase coil 25W2 and the third W-phase coil 25W3 are formed on the stator core 22 by wave winding so as to alternate between eleven slot pitches (or the short-pitch winding) and 13 slot pitches (or the long-pitch winding).

That is, in the case where the number of slots per pole per phase is three, five, seven and so forth, the stator has coils of full-pitch winding. When the number of slots per pole per phase is four or more, the stator has two or more different combinations of coils that alternate between the coil pitch of the short-pitch winding and the coil pitch of the long-pitch winding.

Although in the above-described embodiment the stator 13 of the rotary electric machine M has three phases, it may have four or more phases.

The stator of the present invention may have any number of poles other than four, six and eight poles. When the rotary electric machine M is used for driving a vehicle, however, it is preferable that the stator should have four to 16 poles from the viewpoint of the size, performance and cost of the rotary electric machine M.

In the above-described embodiment, the second U-phase preformed coil 26U2 is inserted in the first U-phase preformed coil 26U1 placed on the inserter 50. Alternatively, the first U-phase preformed coil 26U1 may be arranged outside the second U-phase preformed coil 26U2 which has been placed on the inserter 50 previously. In this case, the terminating end UE2 of the second U-phase preformed coil 26U2 is bent along the outer connecting portion 28B of the bend 28 for preventing the terminating end UE2 from interfering with the first U-phase preformed coil 26U1. The length of the terminating end UE2 is set the same as or smaller than the length $L_S$ of the coil pitch of five slot pitches (or the short-pitch winding). The terminating end UE2 of the second U-phase preformed coil 26U2 is located on the inner side of the slot 24U22.

The present invention may be applied to a stator of the (outer rotor type) rotary electric machine in which the rotor is rotatable around the stator 13.

The present invention may be applied also to a stator for an induction type rotary electric machine or a reluctance type rotary electric machine rather than the permanent magnet type rotary electric machine in which the permanent magnets are used for the rotary electric machine M.

What is claimed is:

1. A stator of a rotary electric machine with a plurality of poles, comprising:
a stator core having teeth that define therebetween a plurality of slots; and
polyphase coils provided in the slots, each phase of the polyphase coils having a plurality of coils that are formed for each pole and connected in parallel, wherein when winding in which a coil pitch is equal to number of the slots divided by number of the poles is termed full-pitch winding, when winding in which a coil pitch is larger than the coil pitch of the full-pitch winding is termed long-pitch winding, and when winding in which a coil pitch is smaller than the coil pitch of the full-pitch winding is termed short-pitch winding, at least two of the coils of each phase are formed on the stator core by wave winding so as to alternate between the long-pitch winding and the short-pitch winding along a circumferential direction of the stator core, wherein each of the coils connected in parallel is provided by a seamless conducting wire and has a pair of lead wires extending from portions that form the short-pitch winding, length of at least one of the paired lead wires being the same or smaller than length of the coil pitch of the short-pitch winding.

2. The stator of the rotary electric machine according to claim 1, wherein the polyphase coils are three-phase coils whose lead wires are all arranged in a mechanical angle for three poles.

3. The stator of the rotary electric machine according to claim 2, wherein the number of the poles is four to 16.

4. The stator of the rotary electric machine according to claim 1, wherein one of the paired lead wires is connected to a neutral point at a position that is radially inward of the stator core.

5. The stator of the rotary electric machine according to claim 1, wherein each coil is formed by inserting a preformed coil into the slots, the preformed coil including U-shaped bends, each bend having a pair of straight portions to be inserted in the slots and an arched outer connecting portion connecting the straight portions, an arched inner connecting portion being formed between two of the adjacent bends for connecting the bends, at least one of the paired lead wires being arranged along the arched outer connecting portion.

* * * * *